May 15, 1956     H. S. VAN BUREN, JR     2,745,161
FASTENING DEVICE
Filed Aug. 2, 1952
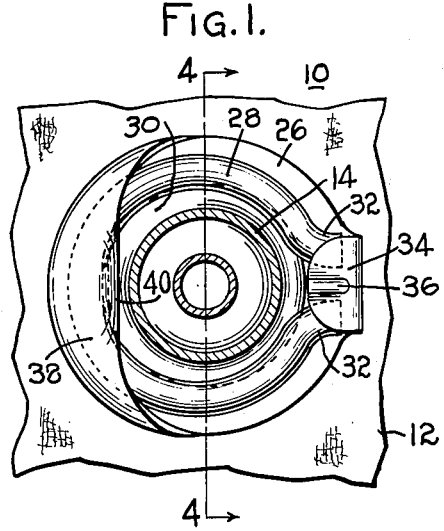
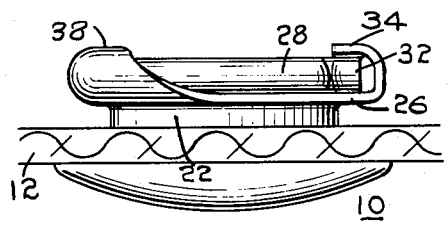
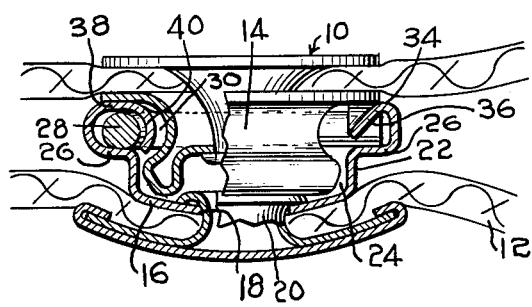
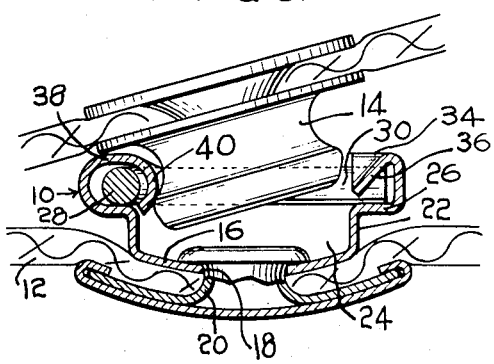
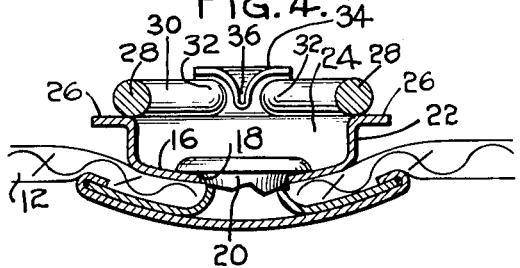
INVENTOR:
HAROLD S. VAN BUREN JR.,
BY *Robert E Ross*
                                ATTORNEY.

UNITED STATES PATENT OFFICE 2,745,161
Patented May 15, 1956

2,745,161

FASTENING DEVICE

Harold S. Van Buren, Jr., Cambridge, Mass., assignor, by mesne assignments, to United-Carr Fastener Corporation, Boston, Mass., a corporation of Delaware Application August 2, 1952, Serial No. 302,315

1 Claim. (Cl. 24—218)

This invention relates generally to fastening devices, and has particular reference to a snap fastener socket of the three side lock type.

Snap fastener sockets of this type are commonly formed of a sheet metal shell having a ring spring assembled therewith to receive a shouldered stud in snapping engagement. Various means are provided to impart a so-called three-side-lock feature to the socket, so that the stud and socket can be separated only by a disengaging force applied to one determined side of the assembled stud and socket.

When such sockets are used on military clothing or equipment, it has been found that the fastener is frequently rendered inoperative when the socket becomes filled with dirt, mud, sand, or the like. Since the spring of the socket must expand to pass over the head of the stud during engagement or disengagement, mud retained in the socket between the spring and the housing will prevent the spring from expanding. Hence in such circumstances the stud cannot be assembled into the socket, or if already assembled, it cannot become disengaged from the socket.

Another disadvantage of such sockets is that their action, that is, the force required to unsnap the stud from the socket, is not as uniform as is desired, since the orientation of the spring can vary in relation to the unlocking side of the socket. When the ends of the spring are disposed on the locking side, for example, the action of the fastener is considerably harder than it is when the ends of the spring are disposed on the unlocking side. The action of the fastener is also influenced by the side and position of the burrs on the ends of the spring resulting from the cutting off of the spring during the forming thereof.

The object of the invention is to provide an improved three-side-lock socket which eliminates the above disadvantages, in that the operation of the fastener is not affected by mud and dirt, and having a construction that provides a uniform action at all times.

In the drawing:

Fig. 1 is a top plan view of a socket member embodying the features of the invention with an assembled stud shown in section;

Fig. 2 is a view in side elevation of the socket member of Fig. 1;

Fig. 3 is a view in section of an assembled stud and socket;

Fig. 4 is a view in section of the socket of Fig. 1 taken on line 4—4 of Fig. 1; and Fig. 5 is a view in elevation partly in section of a stud and socket illustrating the method of assembly.

Referring to the drawing, there is illustrated a three-side-lock fastener socket 10, which is adapted for assembly onto a supporting sheet 12, to receive a shouldered stud 14 in snapping engagement.

In the illustrated embodiment, the socket 10 is of the three-side-lock type, that is, an assembled stud may be removed from the socket only by a disengaging force applied on one predetermined side of the assembly, as will be more fully described hereinafter. However, certain aspects of the invention are also applicable to other types of snap fastener sockets.

The socket 10 is preferably formed of sheet metal and comprises a base 16 having a central opening 18 to receive an attaching rivet 20, a peripheral wall 22 disposed about the base forming a stud-receiving cavity 24, and a peripheral flange 26 disposed about the wall 22.

To receive the stud 14 in snapping engagement, a split ring spring 28 having a central stud-receiving opening 30 is disposed on the flange. The spring 28 may be formed of resilient material such as brass or phosphor bronze, and is provided with opposing end portions 32 which are turned outwardly. To retain the spring 28 in assembly on the flange, a tongue 34 extends from the flange over the outwardly turned ends 32 terminating outside of the spring opening 30 to avoid interference with the inserted stud. To prevent rotation of the spring on the flange, the tongue 34 is provided with a downwardly creased portion 36 which projects downwardly between the ends 32 of the spring. The opposite side of the flange 26 is provided with an upper retaining flange 38 which extends over the spring, and to impart a locking feature to the socket, a locking tab 40 extends from the medial portion of the upper flange 38 as an integral extension thereof around the spring so as to be disposed in the stud-receiving spring opening 30 for engagement with the shoulder of an assembled stud. The portion of the spring between the tongue 34 and the upper flange 38 is exposed so as to be freely expansible outwardly.

The stud 14 is assembled into the socket by tilting the stud into the spring opening 30 so that the shoulder of the stud is disposed under the locking tab 40, and then snapping the other side of the stud past the spring on the opposite side of the socket so that the ends 32 spring apart to permit the stud to pass through the spring opening. Thereafter, disengagement of the stud from the socket may be effected only by a separating force applied to the assembly on the side opposite the locking tab 40, since at other points on the periphery, disengagement is prevented by the engagement of the locking tab with the shoulder of the stud.

The provision of the outwardly turned ends 32 of the spring and the projection 36 disposed between the ends provides a socket with a more uniform action than previous sockets of the three side lock type, since the outwardly turned ends insure that burrs present on the ends of the spring, resulting from the cutting off of the spring during the forming thereof, will not interfere with the stud during insertion and removal thereof, and the projection 36, in preventing the rotation of the spring, insures that the ends of the spring are always in the same position in relation to the unlocking side of the fastener. Hence, the expansion of the spring during passage of the stud therethrough will always occur in the same manner.

The principal advantage of the socket is its ability to operate satisfactorily when coated with mud, by reason of the large exposed portions of the spring. Since the spring is substantially unconfined laterally at the points of greatest movement during operation, that is, the portion adjacent the free ends, mud and dirt contaminating the socket cannot interfere with the lateral expansion thereof. For the same reason, mud and dirt may be more readily removed from the socket.

Although in the illustrated embodiment, the spring is in the form of a split ring, in some cases a continuous endless spring may be used, in which case the means for preventing rotation of the spring will be unnecessary.

Since certain other obvious changes may be made in the device without departing from the scope of the invention, it is intended that all matter contained herein be interpreted in an illustrative and not a limiting sense.

I claim:

A three sided lock snap fastener socket comprising a base for attachment to a supporting sheet, an upstanding peripheral wall disposed on the base forming a stud receiving aperture, and a radially extending flange disposed on the upper edge of the wall, a split ring spring resting on the flange, said flange having an integral tab on one side thereof extending over the ends of the spring, a detent extending downwardly from said tab between the end portions of the spring to prevent lateral movement of the spring portions without restricting the flexing of the ends thereof, and an integral spring retaining flange secured to said radially extending flange and extending over and enveloping a portion of the spring along a point diametrically opposite said tab whereby said spring retaining flange extends into the aperture to engage the shoulder of an assembled stud to prevent separation of the stud and socket by a separating force applied on said opposite side, the portions of said radially extending flange on either side between said spring retaining flange and said tab being unobstructed.

References Cited in the file of this patent

UNITED STATES PATENTS

| | | |
|---|---|---|
| 573,188 | Richardson | Dec. 15, 1896 |
| 1,188,896 | Carr | June 27, 1916 |
| 1,296,001 | Milano | Mar. 4, 1919 |
| 1,699,486 | Carr | Jan. 15, 1929 |
| 2,162,275 | Stanchfield | June 13, 1939 |
| 2,239,004 | Jung | Apr. 22, 1941 |
| 2,328,016 | Huelster | Aug. 31, 1943 |
| 2,567,891 | Murphy | Sept. 11, 1951 |
| 2,644,214 | Van Buren | July 7, 1953 |